April 19, 1927.  F. G. DIAGO  1,625,020
AIRPLANE LAUNCHING AND LANDING APPARATUS
Filed April 9, 1926  6 Sheets-Sheet 2
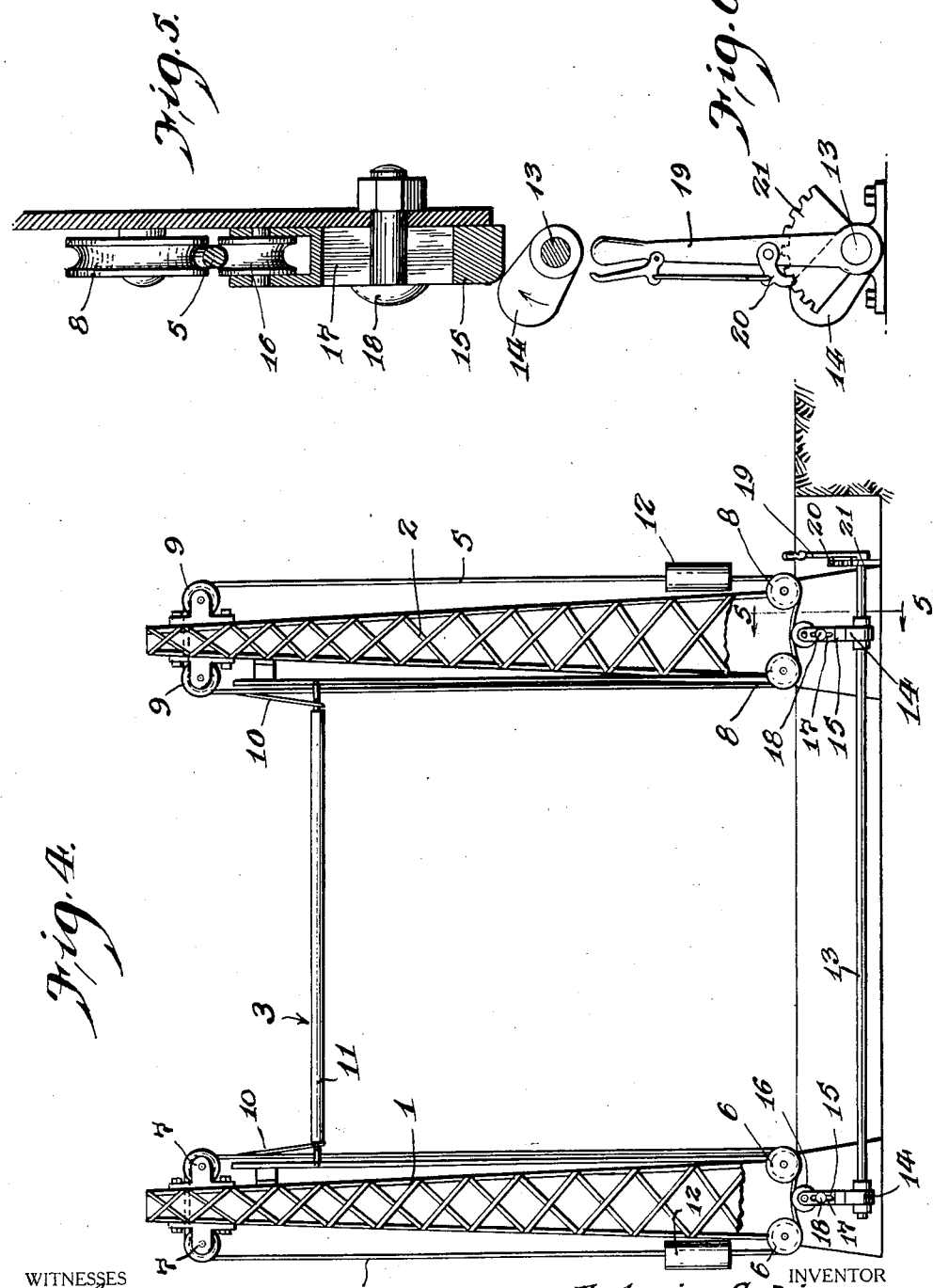
INVENTOR
Federico G. Diago,
BY
ATTORNEYS

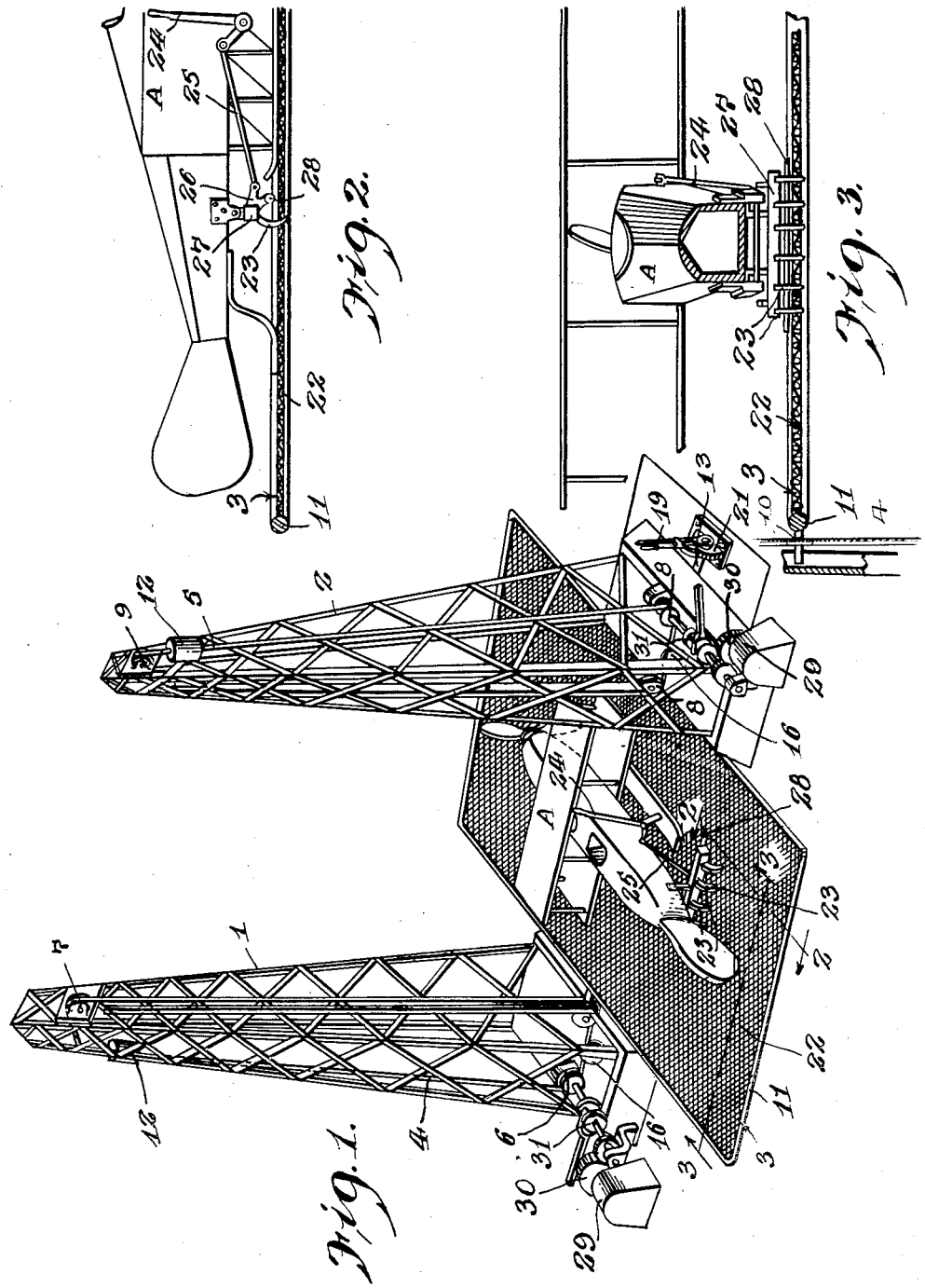

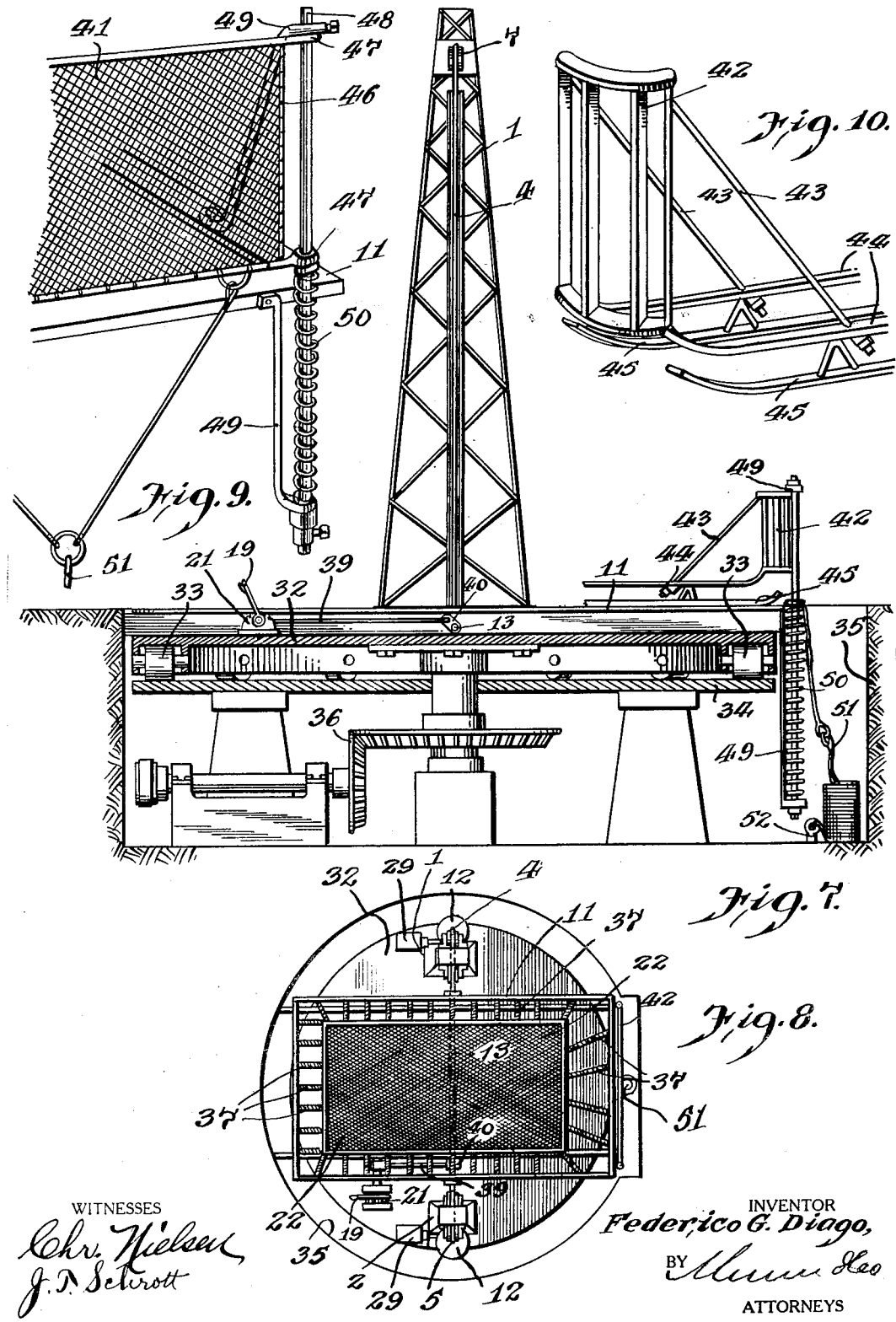

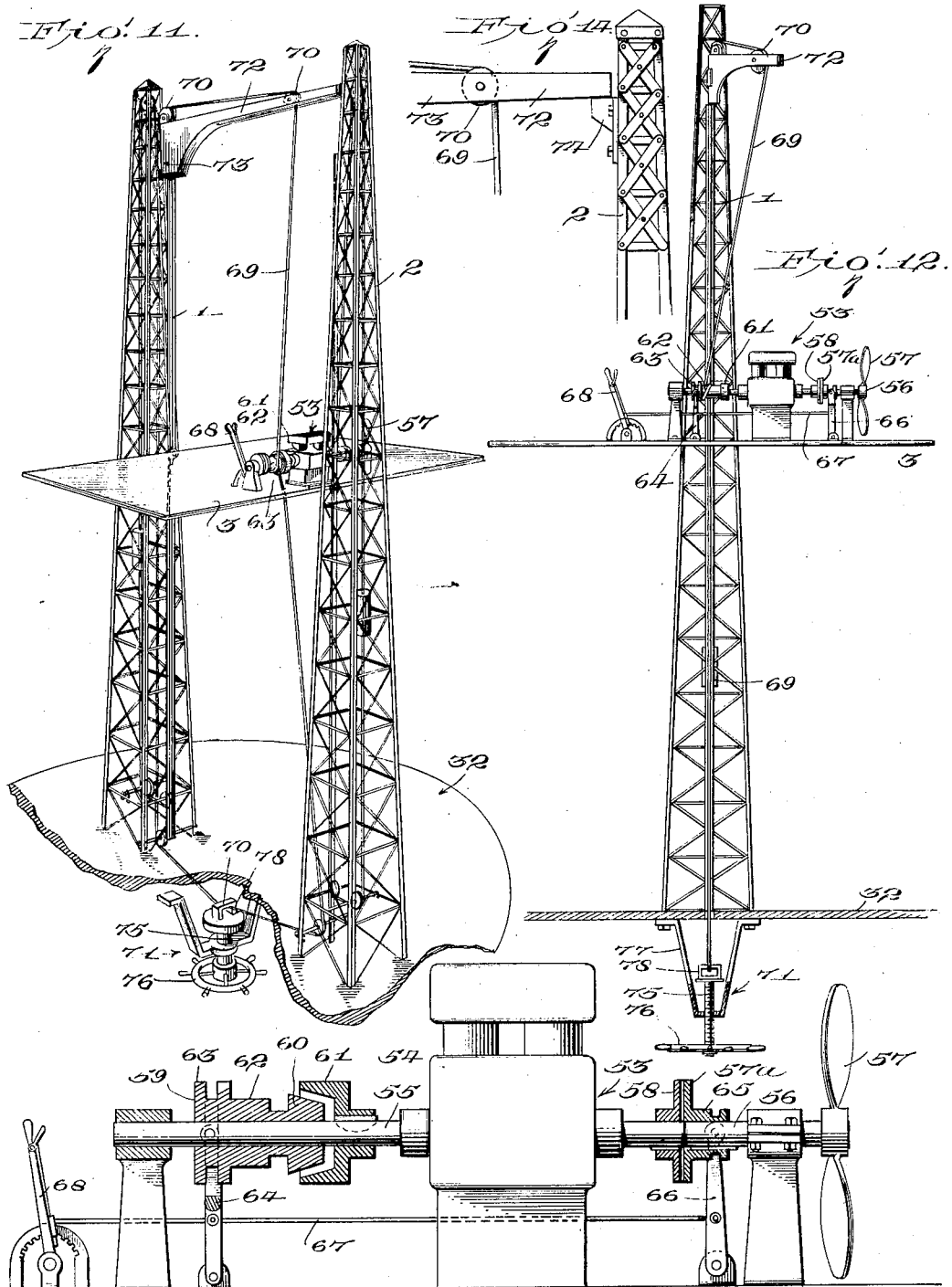

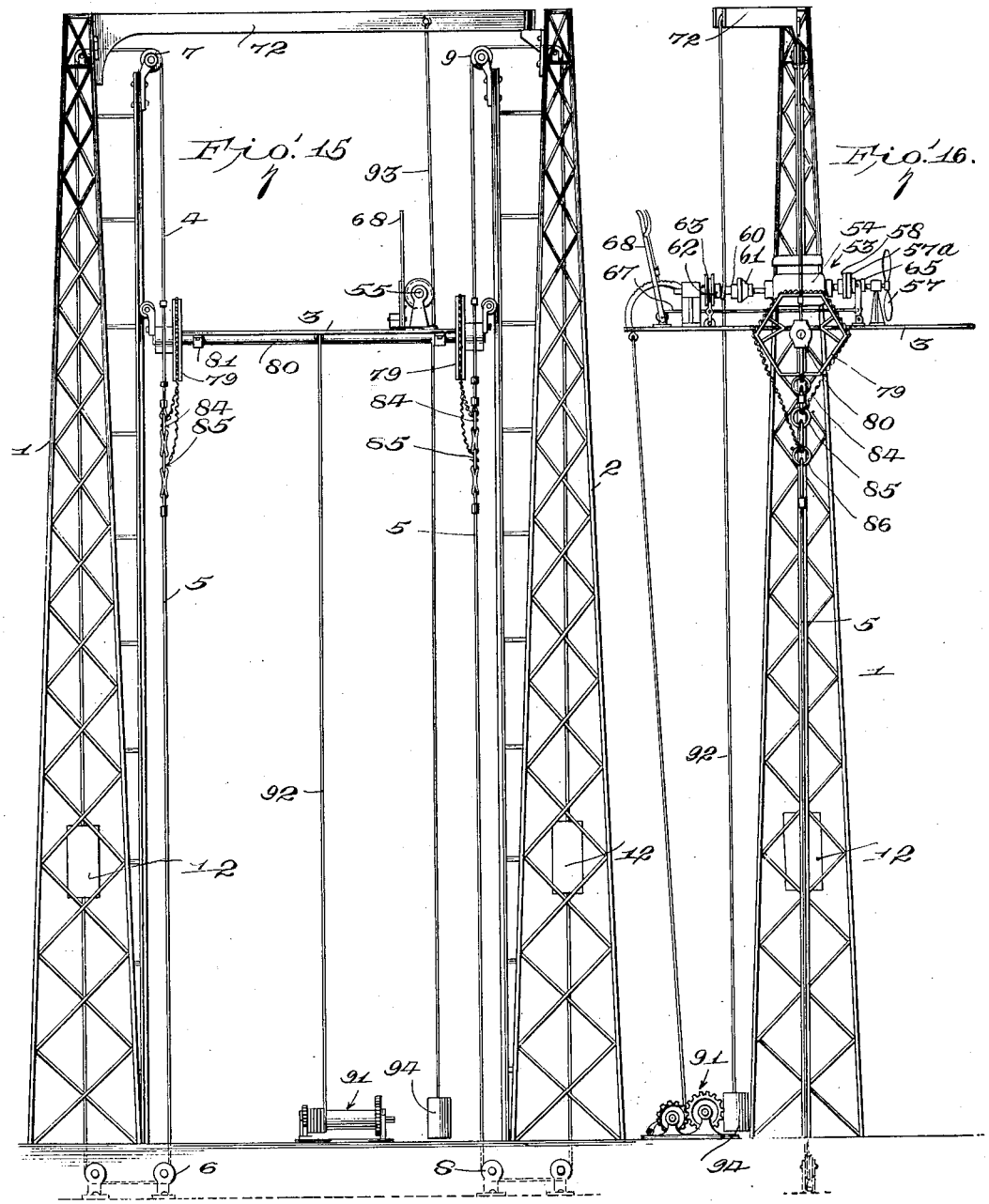

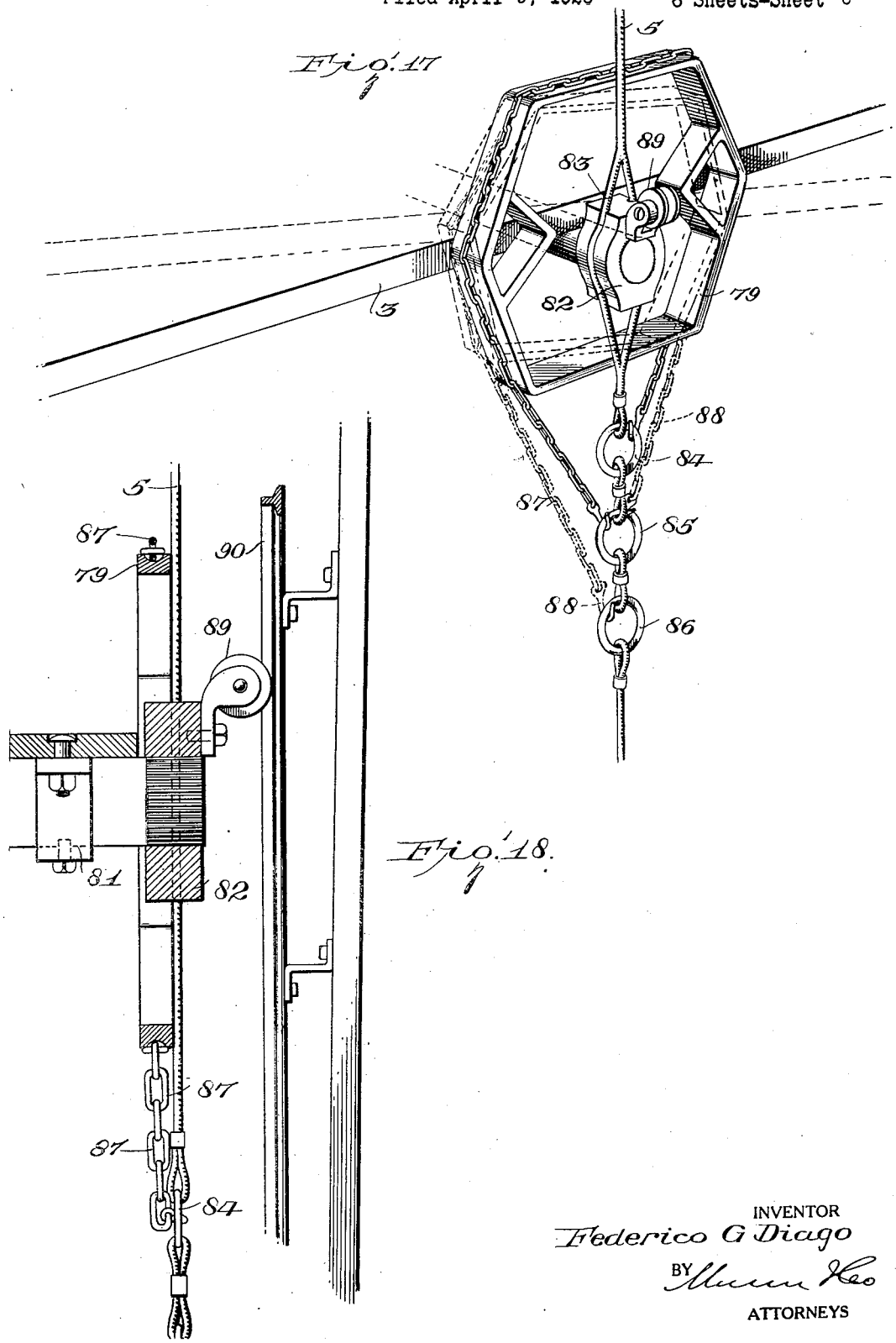

Patented Apr. 19, 1927.

1,625,020

UNITED STATES PATENT OFFICE.

FEDERICO GUILLERMO DIAGO, OF HABANA, CUBA.

AIRPLANE LAUNCHING AND LANDING APPARATUS.

Application filed April 9, 1926. Serial No. 100,935.

This invention relates to improvements in airplane launching and landing apparatus and it consists of the constructions, combinations and arrangements herein described and claimed.

An object of the invention is to provide an apparatus for facilitating the launching and landing of aircraft, particularly airplanes, in restricted places to which ends the apparatus includes a landing platform which is capable of elevation to an appropriate height, it being optional whether the apparatus is stationarily located in one instance, or mounted upon a turntable in another instance to give the added advantage of directional launching and landing.

Other objects and advantages appear in the following specification, reference being had to the accompanying drawings, in which—

Figure 1 is a perspective view of the stationarily located launching and landing apparatus.

Figure 2 is a detail sectional view taken substantially on the line 2—2 of Figure 1, illustrating the employment of a gripper by means of which the airplane is prevented from running off the platform.

Figure 3 is a detail section on the line 3—3 of Figure 1, illustrating a rear view of the gripper.

Figure 4 is an end elevation of the apparatus, the landing platform being in the elevated position.

Figure 5 is a detail sectional view of a part of the brake, taken substantially on the line 5—5 of Fig. 4.

Figure 6 is an end elevation of the brake lever.

Figure 7 is a sectional view illustrating the mode of mounting the apparatus upon a turn table.

Figure 8 is a detail plan view of the apparatus according to the arrangement in Figure 7.

Figure 9 is a detail perspective view of the guard carried by the landing platform in Figure 7.

Figure 10 is a detail perspective view of part of the aircraft chassis, illustrating the use of a bumper or fender which coacts with the guard in Figure 9.

Figure 11 is a perspective view of the apparatus illustrating the use of propeller mechanism for tilting the platform.

Figure 12 is an elevation of the apparatus with one of the towers omitted, the turntable being shown in section, Figure 13 is a detail view of the propeller mechanism, parts being shown in section, Figure 14 is a detail elevation of a portion of one of the towers illustrating the rest for the transverse cable arm, Figure 15 is a front elevation of the apparatus disclosing variable means for turning the platform, Figure 16 is a side elevation of the structure in Fig. 15.

Figure 17 is a detail perspective view of a portion of the platform showing one of the tilting arrangements at one end of the axle.

Figure 18 is a detail sectional view of a portion of the apparatus.

As already briefly stated, it is the purpose of the invention to provide an apparatus by the use of which it is possible to launch and land aircraft in restricted spaces. The apparatus is designed particularly for the heavier than air type of aircraft, commonly known as airplanes. Rapid development in this kind of aircraft makes it evident that the provision of space both for launching and landing will become a serious problem.

It is anticipated that this problem will approach the proportions of the traffic problem of finding adequate space for the parking of automobiles, and other motor vehicles. The solution of the anticipated problem is herein solved by providing an apparatus which elevates the airplane to a desired height whereupon the airplane can "take-off". Similarly, it is intended that the airplane upon its return shall be received at the same elevation, then lowered to its final resting place.

Upon reference to the drawings, provision is made of a pair of steel towers 1 and 2 between which a landing platform, generally designated 3, is raised and lowered by means of steel cables 4 and 5. The towers are of any approved construction, but preferably are built of steel to resemble some of the radio antenna towers or masts now in familiar use.

Pairs of sheaves 6 and 7 respectively at the bottom and top of the tower 1 support the cable 4. Similarly, pairs of sheaves 8 and 9, respectively at the bottom and top of the tower 2 receive the cable 5. These cables are continuous, that is to say the ends are connected to produce a continuous loop which is applied to the various sheaves. Each of the cables is suitably attached at 10 (Fig. 4) to the frame 11 of the landing platform. Weights 12 appropriately affixed to the cables, assist in balancing the landing platform independently of a brake mechanism which is usually employed when lowering the airplane but may also be employed during the raising operation.

This brake mechanism is composed of a common shaft 13 (Figs. 4, 5 and 6) which carries a pair of cams 14 for the purpose of engaging a block 15, in each instance, carrying a wheel 16. These wheels, which are aptly termed brake wheels, engage that portion of the cables 4 and 5 between the lowermost pairs of sheaves 6 and 8 (Fig. 4). Upon upward movement of the blocks 15 the brake wheel 16 bears against the cables and produces a braking action.

The blocks 15 are appropriately guided in their sliding movement, the use of a slot 17 and fixed stud 18 serving as an illustration of a means that may be employed.

A handle 19 (Fig. 6) is affixed to one end of the common shaft 13 so that the shaft may be turned. The handle includes a detent 20 which engages the fixed quadrant 21 so that the adjustment of the shaft 13 and the cams 14 may be held as long as desired. The braking effect increases as the handle 19 is moved toward the right in Figure 6.

The landing platform comprises the frame 11, mentioned before, this frame being composed of sufficiently heavy steel to withstand the demands made of it. In practice the frame will be braced to give it the necessary rigidity. The frame carries a woven fabric 22 which provides the surface upon which the airplane A (Fig. 1) is intended to rest. This woven fabric will probably be composed of wire, but the particular style of weaving is regarded as immaterial.

In order that the airplane may be held in place upon the landing platform during the periods of elevation and lowering use is made of a gripper 23 (Figs. 1, 2 and 3) which is made to engage the interstices of the woven fabric my means of a handle 24. This handle is accessible to the operator and includes a rod 25 which is connected to a crank 26 on the bar 27 from which the teeth 23, composing the gripper, extend as shown. A motion of the handle 24 in the forward direction will turn the gripper into engagement with the platform fabric. The reverse motion will disengage the gripper but cause the engagement of a bar 28 with the fabric for the purpose of facilitating the withdrawal of the gripper teeth.

One of several modes capable of employment to elevate the landing platform 3 is the use of a pair of hoisting machines 29 (Fig. 1) which are geared at 30 with the shafts of one of each of the pairs of sheaves 6 and 8. An appropriate clutch 31 may be incorporated in each of the shafts. Upon starting the hoisting machine, the landing platform is elevated until it reaches the desired height. Upon lowering the platform the clutches 31 may be disengaged so that the brake handle 19 may be employed to its full advantage.

As has been stated it is optional whether the apparatus be stationarily located as in Figure 1 or made to turn so that the advantages of directional launching and landing may be had. The latter arrangement involves the use of a turntable 32 (Figs. 7 and 8) upon which the towers 1 and 2 are built. The turn table has suitable rollers 33 which ride upon an appropriate track plate 34 in the pit 35. The turntable is driven by gearing 36 which, in turn, is driven by an appropriate motor under a suitable control, neither of the latter being herein disclosed, as the arrangement of each is regarded as obvious. It is regarded unnecessary to repeat the description of the mounting and operation of the cables 4 and 5 because it is intended that these shall be identical with the former disclosure.

Instead of attaching the woven fabric 22 directly to the landing platform frame 11 as in Figure 1, the fabric is now attached by means of interposed springs 37. These must be quite heavy because the weight of an airplane is usually considerable. The brake handle 19 is mounted upon the turntable. It is connected with the common shaft 13 by means of a rod 39 and crank 40.

In place of the gripper arrangement described in connection with Figures 1, 2 and 3, use is now made of a guard 41 (Fig. 9) against which the bumper 42, with which the airplane is provided, may engage to prevent premature riding off of the airplane. The bumper is suitably braced at 43 upon the chassis 44 of the airplane. The chassis is also equipped with stout steel skids 45 which are intended to take the place of the usual airplane landing gear.

The guard 41 includes a rectangular frame 46 (Fig. 9) which has pairs of eyes 47 to ride upon a pair of upright parallel rods 48. These are stationarily held upon the frame 11 by brackets 49. Springs 50, disposed between the lowermost eyes 47 and brackets 49 keep the guard 41 elevated, but upon a pull on the leash cable 51 the guard 41 is depressed below the level of the frame so that the airplane can be driven off without obstruction.

The leash cable 51 is assembled in a coil in the pit 35 (or other suitable place) while the landing platform is in the lowermost position. The opposite end of the cable is attached to a ring bolt 52. Upon elevation of the landing platform the cable uncoils. The length of the cable is shorter than the height of elevation of the landing platform with the result that when the cable becomes taut the guard 41 will be drawn down against the tension of the springs 50 so that the upper edge of the guard is depressed below the landing platform for the purpose stated.

The foregoing description is based upon a hoisting apparatus, the platform of which is capable of tilting in reference to the towers when the airplane propeller is set in motion while the platform is near the ground. It also covers specific hoisting mechanism by which the platform can be raised to the top of the towers, at times when it is deemed inexpedient to set the airplane propeller in motion. The principle of operation is announced later. The following forms of the invention are based upon the same principle, but the construction is somewhat different as presently appears.

Inasmuch as there are corresponding parts in all forms of the invention, identical numerals are used for those parts without repeating the description here. For example, the towers 1 and 2 and the platform 3 are the same in all instances. Reference is made first to Figures 11 to 14 inclusive. Here the platform 3 is shown provided with a propeller mechanism generally indicated 53.

This mechanism, although appearing relatively large in the drawings, is in practice quite small in comparison with the area of the platform 3 so that even though the mechanism 53 is mounted upon the platform, there still is ample room for the airplane. The engine 54 has a shaft 55 which projects a considerable distance from the end of the crank case.

An extension 56 of the right end of the engine shaft 55 (Fig. 13) carries a propeller 67 which is capable of operation when the movable clutch element 57$^a$ on the extension shaft 56 is brought into engagement with the fixed element 58 on the engine shaft.

A movable but loosely mounted sleeve 59 on the left end of the engine shaft 55 has a clutch cone 60 formed thereon for engagement with a corresponding nut 61 that is fixed on the engine shaft. The sleeve 59 includes a cable drum 62 and a grooved collar 63 to which the forked end of a rockable lever 64 is applied to the shifting of the sleeve.

On the same principle the movable clutch element 57 has a grooved collar 65 to which the forked end of a lever 66 is applied. These levers are connected by a rod 67 which extends beyond the lever 64 and has connection with a ratchet lever 68. Upon pulling the lever 68 to the left (Fig. 13) the corresponding rocking of the levers 64 and 66 will disengage the clutch 60 and engage the clutch 57, thereby setting the propeller 67 in motion but letting the sleeve 59 remain idle. Upon moving the lever 68 to the right the reverse effect takes place.

Presuming the ratchet lever 68 to have been moved to the right, the engagement of the clutch cone 60 with the hub 61 will impart rotation to the sleeve 59 so that a winding and unwinding action upon a lifting cable 69 takes place. This cable is made in a continued loop, as may be seen in Figure 6, that has one turn about the drum 62. The cable is applied to guide pulleys 70 at appropriate places, thereby disposing the cable in a substantial rectangle, there being a tension device 71 at the bottom by means of which the cable may be tightened or slackened as necessary.

One of the foregoing pulleys is mounted upon an arm 72. This arm is hingedly mounted at 73 upon the tower 1 permitting swinging the arm either into the transverse position at which time the extremity engages a rest 74 on the tower 2 or in a position to one side of the tower 1 whereupon the space is cleared for the landing of an airplane. The foregoing winding action raises the platform 3.

The tension device 71 is composed of a screw shaft 75 which has a hand wheel 76 for manual turning. The screw shaft turns in a bearing bracket 77 on the under side of the turntable 32. The screw shaft has a swivelly mounted yoke 78 through which the cable 69 passes. It is clear that turns of the screw shaft 75 in appropriate directions will either tighten or loosen the cable 69.

Reference is next made to Figures 15 to 18. Although the propeller mechanism 53 is shown mounted on the platform 3, this mechanism, may, in this form of the invention, be omitted, inasmuch as other specific tilting means is disclosed. This tilting means comprises a hexagonal frame 79 suitably secured to the edge of the platform 3 adjacent to the end of an axle 80. This axle is suitably secured to the platform at 81, and the ends project from the edges of the platform a sufficient distance to be received by bearings 82. These bearings and the ends of the axle are slightly roughened to retard the rocking motion of the platform and to exhibit a tendency to hold the platform in its tilted positions.

The bearings 82 are firmly gripped in the bights 83 (Fig. 17) of the hoisting cables 4 and 5 (equivalents of the cables 4 and 5 in Figure 4). Each of these cables has a number of rings 84, 85 and 86 (Fig. 17) incorporated therein. A chain 87, applied to peripheral portions of the hexagonal frame 79 has hooks 88 at the ends to be engaged with a pair of the rings. For example the hook at one end of the chain will be engaged with the ring 84 while the hook at the other end is engaged with the ring 86. Upon desiring to fix the platform 3 in a tilted position (see dotted lines) the hooks are engaged with the ring 85. The platform is thereby held in the tilted position.

A grooved roller 89, mounted upon each of the bearings 82 rides upon a guide 90 that is fixed on the adjacent tower. Use is made of a small hoisting apparatus 91 (Figs. 15 and 16) in pulling on one end of the platform 3, thereby assisting in setting it in a particular tilted position. A cable 92 attached to one end of the platform is wound upon the drum of the hoisting apparatus. The hoisting apparatus is used both to establish the initial tilt of the platform, and is operated later either to take up or pay out the cable depending on whether the platform is lowered or raised.

The operation is readily understood. In any case the airplane A is moved upon the landing platform 3 either by hand or under its own power. Having got the airplane in place it becomes the purpose of the invention to elevate the platform between the towers 1 and 2 so that the airplane may take-off. The elevation of the platform is accomplished either by the power of the airplane propeller or by the hoisting mechanisms disclosed in Figures 1 and 11.

The hoisting of the platform by the power of the airplane propeller occurs on this principle: A self-impelled body will move forwardly and upwardly if properly guided, if inertia and gravity are overcome. The self-impelled body is the airplane. The inertia of the airplane is overcome by the rapidly revolving propeller. Gravity is overcome by the counterweight 12. The airplane is prevented from moving off of the platform 3 by the engagement of the gripper 23 with the woven fabric or net of the platform. The revolving airplane propeller therefore induces the platform to rise, and when the platform reaches the appropriate altitude, the operator releases the gripper so that the airplane takes off in an upward course.

In moving upwardly in the manner described the tendency of the platform is to tilt upwardly. The airplane is therefore set in position for a take-off in the proper direction. This automatic hoisting of the airplane is accomplished either by the power of the airplane propeller as proposed in the form of the invention in Figure 1 or by the power of propeller mechanism 53 as in Figure 11. The same mechanism may be employed in the form of the invention in Figures 15 and 16.

In any of these cases the hoisting of the platform 3 is accomplished by operation of the principle announced. It is anticipated that conditions may be encountered wherein it may be found inexpedient to employ either the airplane propeller or the mechanism 53 for the purpose. The mechanical hoists in Figure 1 are then employed. After the platform 3 is got to the top of the towers either the airplane propeller or the propeller mechanism 53 are set in motion to tilt the platform. It may be found undesirable to use the propeller mechanism for this purpose under the particular conditions noted, and in such event the tilting mechanism in Figures 15 to 18 is employed. The airplane propeller is set in motion so that when the airplane is released it will launch into the air in the proper direction.

Reverting to the operation of the propeller mechanism 53. The lifting cable 69 is employed as a medium along which the drum 62 is made to creep, so to speak, thereby transporting the platform 3 to the proper altitude. It should have been stated in the form of the invention in Figure 15 the lifting cable 59 is replaced by a cable 93 which is held taut by a heavy weight 94. This cable takes a turn around the drum 52 and serves a purpose identical with that of the cable 69. As soon as the platform 3 is got to the top, the ratchet lever 68 is moved to the left as in Fig. 13 whereupon the propeller 57 is connected with the engine 54 and the tilting function of the platform begins.

The operation of the arrangement in Figure 7 may be briefly repeated. Considering the towers 1 and 2 to be approximately 300' high the leash cable 51 will be made of such length that it becomes drawn taut before the landing platform reaches the limit of its upward movement, due allowance being made for the necessary tilting of the platform as hereinbefore described. Upon drawing the cable 51 taut the guard 51 is pulled down so that its upper edge is depressed below the level of the landing platform. The airplane being thus released flies off without obstruction as already described.

The arrangement in Figure 1 is comparatively simple, but does not have the advantage of the arrangement in Figures 7 and 8, which latter arrangement includes the turntable 32 by means of which the apparatus can be turned in any desired direction to permit directional launching or landing. The turntable makes it possible to launch the airplane directly into the wind regardless of the direction from which the wind may come.

The apparatus is used to equally good advantage for landing airplanes. The platform 3 is tilted in the opposite direction, i. e. in a direction opposite to that employed when launching the airplane. It is in this instance that the arrangement in Figs. 15 to 18 has its value. Upon changing the position of the chain 87 in reference to the eyes 84 to 86 the desired tilt of the platform may be got and held. If the airplane was permitted to alight upon a level platform the tendency would be to prolong the run of the airplane before it came to a stop. But by tilting the platform upwardly the airplane will come to a stop very promptly.

While the construction and arrangement of the improved airplane launching and landing apparatus is that of a generally preferred form, obviously, modifications and changes may be made without departing from the spirit of the invention or the scope of the claims.

I claim:—

1. Apparatus of the character described comprising a landing platform, a pair of supports between which the platform is located, and counter-weighted cables movable upon the supports and suspending the platform permitting simultaneous raising and tilting of the platform by the traction of a revolving propeller as of an airplane mounted upon the platform.

2. Apparatus of the character described comprising a landing platform, a pair of towers, counter-weighted cables movable upon the towers and supporting the platform between the towers in a normally horizontal position near the base thereof, and means including an airplane mounted upon the platform having a propeller which is revoluble to secure traction thereby producing a forward impulse resulting in the simultaneous raising and tilting of the platform.

3. Apparatus of the character described comprising a landing platform, a pair of towers, cables movably mounted upon the towers, said platform being attached to the cables and supported in position between the towers, means including an airplane anchored upon the platform, said means having a propeller which is revoluble to secure traction thereby producing a forward and upward impulse resulting in the tilting of the platform, and counterweights incorporated in the cables then assisting in the raising of the platform in reference to the towers.

4. Apparatus of the character described comprising a landing platform upon which an airplane is to be mounted, a pair of towers between which the platform is vertically movable, counterweighted cables guided upon the towers and supporting the platform, the revolution of the airplane propeller securing traction which produces a tilting and upward motion of the platform, the latter motion being assisted by the counterweights of the cables, and means to hold the airplane in position upon the platform during the raising period, said means releasing the airplane when a predetermined altitude of the platform is reached permitting the airplane to take-off.

5. Apparatus of the character described comprising a landing platform, a pair of towers, and means to hoist the platform to the top of the towers preparatory to either the launching or landing of an aircraft supported upon the platform.

6. Apparatus of the character described comprising a landing platform, a pair of towers between which the platform is vertically movable, means to hoist the platform to the top of the towers preparatory to the launching or landing of an airplane, and means incorporated in the landing platform with which a part of the airplane is engageable to prevent it from moving off during the hoisting period.

7. The combination in apparatus of the character described comprising a landing platform upon which an airplane is supported, towers between which the platform is vertically movable to either raise or lower the airplane, means to elevate or lower the platform between the towers, a gripper carried by the airplane, a woven fabric incorporated in the platform constituting the base upon which the airplane rests, and means to move the gripper so that it engages the fabric thereby holding the airplane in place during the raising and lowering periods.

8. The combination in apparatus of the character described comprising a frame, a woven fabric of suitable material stretched upon the frame constituting a landing platform, towers between which the platform is operable, means to raise and lower the platform between the towers to either elevate or lower an airplane supported upon the platform, a gripper carried by the airplane including a plurality of teeth, and means to move the gripper so that the teeth engage the woven fabric thereby to hold the airplane in place upon the platform during raising and lowering.

9. The combination in apparatus of the character described comprising a fabric of suitable woven material constituting part of a platform upon which an airplane is to be supported during raising and lowering operations, a gripper carried by the airplane including teeth, means including a handle which is movable in one direction to cause engagement of the gripper teeth with the interstices of woven material thereby to hold the airplane in place, and means associated with the gripper being engageable with the material upon reverse movement of the handle to facilitate extraction of the teeth from said interstices.

10. Apparatus of the character described comprising a landing platform, a pair of towers between which the platform is located, a pair of continuous cables in each of the towers to which the platform is attached for raising and lowering movement, a pair of sheaves at the top of each tower for supporting the upper ends of the cables, and a similar pair of sheaves at the bottom of each tower for supporting the lower ends of the cables.

11. Apparatus of the character described comprising a landing platform, a pair of towers between which the platform is located, a pair of continuous cables in each of the towers to which the platform is attached for raising and lowering movement, a pair of sheaves at the top of each tower for supporting the upper ends of the cables, a similar pair of sheaves at the bottom of each tower for supporting the lower ends of the cables, and means including a wheel which is movable against that portion of each of the cables between one pair of the sheaves to perform a braking action.

12. Apparatus of the character described comprising a landing platform, a pair of towers between which the platform is vertically movable, a pair of continuous cables in each of the towers to which the platform is attached for raising and lowering, pairs of sheaves at the top and bottom of the towers for supporting the cables, a brake wheel for each of the cables engaging therewith between a pair of the sheaves in each tower, means supporting and guiding each of the brake wheels, and means to move the brake wheel supports upon their guides to either brake the cables or release them.

13. Apparatus of the character described comprising a landing platform, a pair of towers between which the platform is located, a pair of cables supported upon the towers for raising and lowering the platform, brake wheels engaging the cables, guided blocks by which the brake wheels are carried, a common shaft having cams to engage the blocks, and a handle having connection with the shaft to move the cams either in one or the other direction thereby to either apply or release the brake wheels.

14. Apparatus of the character described comprising a landing platform, a pair of towers between which the platform is located, means for raising and lowering the platform between the towers, a brake mechanism for controlling the raising and lowering movement, and a turntable upon which the foregoing towers, raising and lowering means and brake mechanism are mounted permitting changing the direction of the landing platform for directional airplane launching and landing.

15. Apparatus of the character described comprising a landing platform, means to raise the platform to the desired elevation for launching an airplane carried thereby, a guard upstanding upon the platform to keep the airplane from running off during elevation, and a leash cable attached to the guard being shorter in length than the launching elevation of the platform thereby causing depression of the guard below the level of the platform when said launching elevation is reached to remove the obstruction to the airplane.

16. Apparatus of the character described comprising a landing platform for supporting an airplane, means to raise the platform to the desired launching elevation and also to lower the platform, a guard carried by the platform to prevent the airplane from running off, means including a spring to normally hold the guard in the operative position, and a leash cable attached to the guard consisting of a length shorter than the extent of elevation of the platform causing depression of the guard below the level of the platform against the tension of the spring when said launching elevation has been reached.

17. Apparatus of the character described including a frame, a woven material situated in the frame constituting a landing platform, and a plurality of springs by means of which said woven material is connected with the frame providing a resilient bed upon which the airplane is supported.

18. Apparatus of the character described comprising a landing platform, a pair of towers, counterweighted cables guided upon the towers and supporting the platform between the towers, a lifting cable, propeller mechanism mounted upon the platform having a drum about which the lifting cable is wound and including a propeller, a driving engine, and means for either driving the drum or propeller from the engine to either raise the platform between the towers or secure such traction as will tilt the platform in reference to the towers.

19. Apparatus of the character described comprising a landing platform, a pair of towers, counterweighted cables guided upon the towers and supporting the platform between the towers, means upon the platform for hoisting the platform in reference to the towers, said means including a drum, a lifting cable wound upon the drum and being substantially coextensive with the towers, pulleys over which the lifting cable is trained, and tension means applied to the lifting cable keeping it taut for proper operation when the drum is revolved.

20. Apparatus of the character described comprising a landing platform, a pair of towers, cables movably mounted upon the towers by which the platform is carried, means carried by each cable in which the platform has bearing, and means for tilting the platform in said bearings and holding the platform tilted during raising and lowering movements of the platform by means of said counterweighted cables.

21. Apparatus of the character described comprising a landing platform having an axle with roughened ends, a pair of towers, counterweighted cables movable upon the towers, bearings attached to said cables having roughened portions receiving the roughened ends of the axle to retard tilting movement of the platform, non-circular frames carried by the platform, a chain applied to each frame terminating in hook ends, and rings incorporated in the cables to be engaged by said hook ends for various tilting adjustments of the platform in reference to the towers.

22. Apparatus of the character described comprising a landing platform having an axle with roughened ends, a pair of towers, counterweighted cables movable upon the towers, bearings attached to said cables having roughened portions receiving the roughened ends of the axle to retard tilting movement of the platform, non-circular frames carried by the platform, a chain applied to each frame terminating in hook ends, rings incorporated in the cables to be engaged by said hook ends for various tilting adjustments of the platform in reference to the towers, guides carried by the towers, and rollers mounted upon the bearings running upon the guides as the platform is raised and lowered.

FEDERICO GUILLERMO DIAGO.